Aug. 3, 1926.
H. D. KELLY
1,594,672
CIRCULATION CONTROL FAUCET FOR COFFEE URNS
Filed April 7, 1924
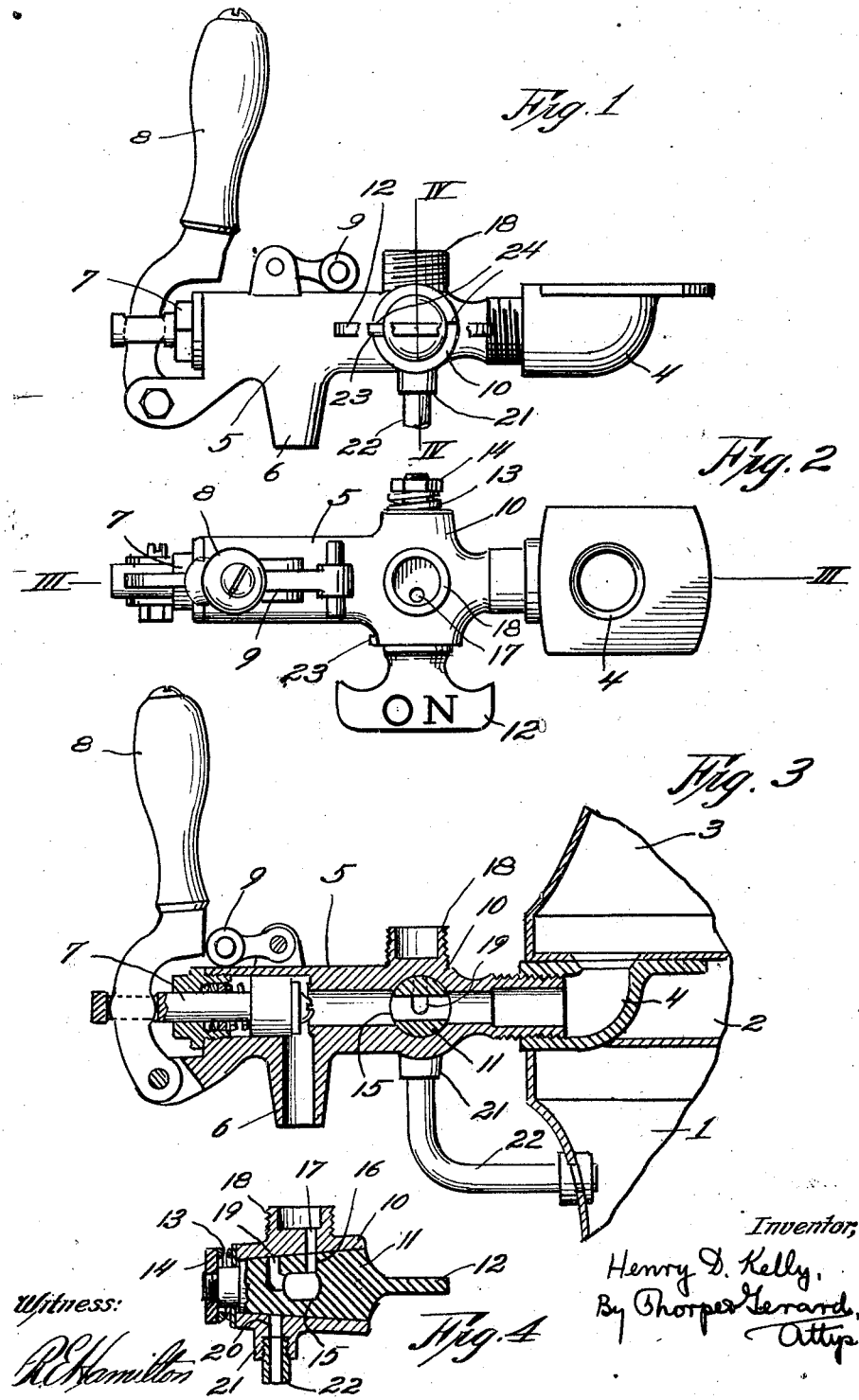
Inventor,
Henry D. Kelly,
By Thorpe & Gerard,
Attys.

Patented Aug. 3, 1926.

1,594,672

UNITED STATES PATENT OFFICE.

HENRY D. KELLY, OF KANSAS CITY, MISSOURI.

CIRCULATION-CONTROL FAUCET FOR COFFEE URNS.

Application filed April 7, 1924. Serial No. 704,736.

This invention relates to control faucets for coffee urns and my object is to provide a faucet and connections whereby the steam, under pressure, produced in the boiler chamber may be employed for the purpose of stirring the coffee which stands in the beverage jar.

It has been found that the first gallon of water passing through the leacher bucket will produce an excessively strong coffee, and that each gallon thereafter will produce progressively weaker coffee. The coffee as it is produced and passes into the beverage jar will stand, in what may be termed a stratified condition, the heavy and weak strength coffee not mixing to any great extent. It will be apparent that this is an undesirable condition and that in order to secure coffee of proper strength, the beverage standing in the jar must be circulated or agitated in some manner.

Another object of the present invention is to provide means for the quick reheating of the coffee standing in the beverage jar, should an emergency arise when it is desired to quickly produce hot coffee, although the reheating of coffee is not a desirable practice as reheated coffee is always of inferior quality.

With the objects named in view, the invention consists in certain novel and useful features of construction and organization of parts as hereinafter described and claimed; and in order that it may be fully understood, reference is to be had to the accompanying drawing, in which:—

Figure 1 is a side view of a faucet and connections embodying the invention.

Figure 2 is a top plan view of the same.

Figure 3 is a section taken on the line III—III of Figure 2, but illustrates the draw-off faucet in open position and also indicates a portion of a coffee urn.

Figure 4 is a section on the line IV—IV of Figure 1.

In the said drawing, where like reference characters identify corresponding parts in all of the figures, 1 indicates the upper end of the boiler chamber which will be charged with steam when the urn is operating under normal conditions, 2 indicates a dead air space and 3 indicates the beverage jar superimposed on the dead air space.

Communicating with the beverage jar is a passageway 4 for the liquid coffee, the outer end of said passageway being engaged by the body 5 of a draw-off faucet having an outlet spout 6 for the exit of the beverage. The faucet is controlled by a valve mechanism 7 having an operating handle 8 and locking lever 9. The faucet and valve mechanism are not referred to in detail as any valve mechanism may be employed with the device and connections of the invention, as will hereinafter appear.

The valve body 5 is enlarged as as 10 at a point between the valve 7 and the beverage jar. Fitted in said enlargement is rotating plug valve 11 formed at one end with an operating handle 12 and held in tight fitting relation by an expansion spring 13 and nut 14 at its opposite end.

The valve 11 is provided with a central transverse passageway 15 registering with the bore of the faucet body 5 to permit coffee to pass out through the faucet upon the operation of the valve 7, and intersecting said passageway 15 at right angles is an auxiliary passage 16. The passage 16 registers with a passage 17 in communication with a threaded nipple 18 adapted for the reception of a gage glass (not shown), when the valve 11 stands in the "on" position and the bore of the faucet is unobstructed. It will be evident that with the construction described, the level of the coffee in the beverage jar will be indicated by the gage glass.

The plug valve 11 is provided with a second auxiliary passage 19 extending parallel to and in the same direction as the passage 16, but communicating with the central passage 15 at a different point. The passage 19 is adapted to register with a passage 20 in communication with a threaded nipple 21 in which is secured one end of a steam pipe 22 communicating at its opposite end with the boiler chamber 1 above the level of the water therein.

The rotation of the plug valve 11 is limited to 180 degrees by means of a stop pin 23 on the valve and a pair of shoulders 24 formed on the casing, see Figure 1. Upon rotation of the plug valve from the position shown in Figure 3, to the limit of rotation in the opposite direction, passages 16 and 17 will be thrown out of communication, and passage 19 will communicate with passage 20, thus permitting steam from the boiler to pass through the faucet body 5 and bubble or boil up through the coffee in the beverage jar and effectually stir the same, it being evident that the passage of the steam under pressure through the coffee will set up a considerable circulation.

In this connection, it is desirable to point out that care must be taken to make sure that the valve 7 is closed before the plug valve 11 is operated, as otherwise steam will exhaust into the beverage chamber and through the spout 6 simultaneously.

It will be evident that as long as there is steam under pressure in the boiler chamber, such steam may be readily utilized either to stir and mix the beverage standing in the jar, or, if desired, by permitting the steam to enter the beverage jar for a slightly greater period of time, may be utilized to reheat the beverage.

From the above description it will be apparent that I have produced a device possessing all of the features of advantage set forth as desirable and while I have described and claimed the preferred embodiment of the same I reserve the right to make all changes properly falling within the spirit and scope of the appended claim.

I claim:

In a coffee urn, a steam chamber, a beverage jar, a valve-controlled draw-off faucet for said beverage jar, a gage glass receiving nipple communicating with said faucet at a point between the valve thereof and the beverage jar, a connection between said faucet and the steam chamber, and a valve for selectively placing the gage glass or connection in communication with the bore of the faucet.

In witness whereof I hereunto affix my signature.

HENRY D. KELLY.